April 18, 1950   J. A. MORRONE   2,504,568
ANTISKID DEVICE FOR TIRES
Filed July 24, 1948

Inventor
Joseph A. Morrone
By Brown & Seward
Attorneys

Patented Apr. 18, 1950

2,504,568

UNITED STATES PATENT OFFICE 2,504,568

ANTISKID DEVICE FOR TIRES

Joseph A. Morrone, Westerly, R. I.

Application July 24, 1948, Serial No. 40,495

12 Claims. (Cl. 152—225)

The object of my invention is to provide a novel, effective and inexpensive anti-skid device for vehicle tires, which device may be readily attached directly to and detached from the tire, each end of the device being provided with means for preventing the unintentional removal of the device from the tire irrespective of the direction in which the tire is rotated.

My invention comprises an anti-skid device having an elastic portion which may be stretched across the tire tread, said elastic portion being provided at each end with a pair of end portions of resilient material having inwardly directed ends, preferably toothed, said ends being either closely adjacent or widely separated, as desired.

My invention also comprises an anti-skid device consisting of a resilient bar of the desired cross sectional shape developed into a looped portion adapted to be stretched across the tire tread, said looped portion being provided at each end thereof with a pair of resilient end portions terminating in inwardly directed ends for biting into the tire, said ends being preferably toothed and being located closely adjacent to each other.

My invention also comprises an anti-skid device consisting of an elastic solid portion, as rubber, which may be stretched across the tire tread, said solid portion being provided at each end with a pair of resilient end portions terminating in inwardly directed ends for biting into the tire on opposite sides of its tread.

Practical embodiments of my invention are represented in the accompanying drawings in which.

Figure 1:
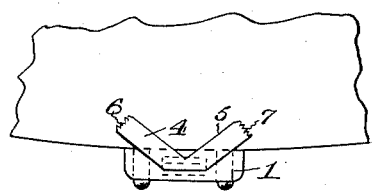
Fig. 1 represents a detail side view of a tire showing, in end elevation, one form of anti-skid device removably attached thereto.
Figure 2:
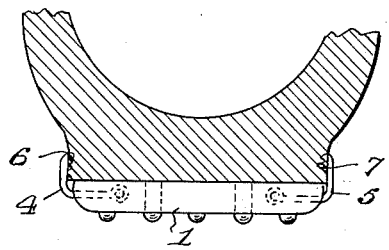
Fig. 2 represents a cross section of the tire, the anti-skid device being shown in side elevation.
Figure 3:
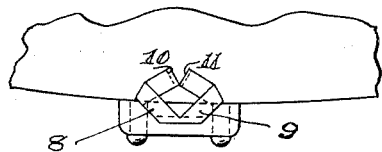
Fig. 3 represents an outer plan view of the device.

In Figs. 1, 2 and 3 the anti-skid device is shown as comprising an elastic solid portion 1 stretchable across the tire tread and having a non-skid tread surface made up of projections 2 and holes 3. Each end of the solid portion 1 is provided with a pair of inclined resilient end portions 4 and 5 permanently united with the solid portion 1 and having widely separated inwardly directed toothed ends 6 and 7 for biting into the tire on opposite sides of its tread.

Figure 4:
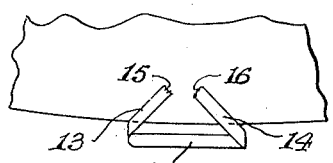
Fig. 4 represents a detail side view of a tire showing, in end elevation, another form of anti-skid device.
Figure 5:
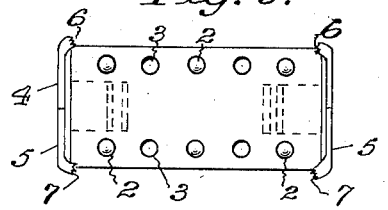
Fig. 5 represents an inner plan view of the device.

In Figs. 4 and 5 each end of the elastic solid portion 1 of the anti-skid device is shown as provided with a pair of inclined resilient end portions 8 and 9 permanently united with the solid portion 1 and developed to provide closely adjacent inwardly turned toothed ends 10 and 11 for biting into the tire on opposite sides of its tread.

Figure 6:
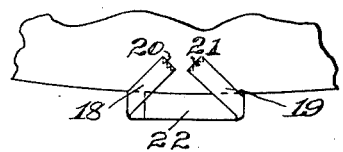
Fig. 6 represents a detail side view of a tire showing, in end elevation, a third form of anti-skid device.
Figure 7:
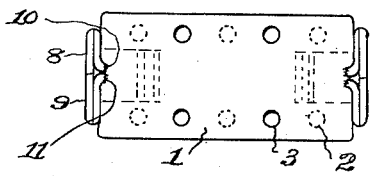
Fig. 7 represents an inner plan view of the device.

In Figs. 6 and 7 the anti-skid device is shown as comprising a resilient flat bar developed into a looped portion 12 adapted to be stretched across the tire tread, said looped portion at each end thereof being divided and bent to form a pair of inclined end portions 13 and 14 terminating in inwardly directed closely adjacent toothed ends 15 and 16 for biting into the tire on opposite sides of its tread.

Figure 8:
Fig. 8 represents a detail side view of a tire showing, in end elevation, a fourth form of anti-skid device.
Figure 9:
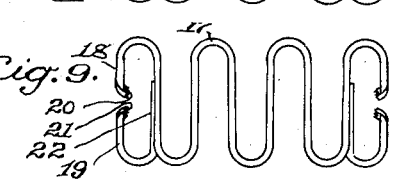
Fig. 9 represents an inner plan view of the device.

In Figs. 8 and 9 the anti-skid device is shown as comprising a resilient flat bar developed into a looped portion 17 adapted to be stretched across the tire tread, said looped portion having at each end thereof a pair of inclined end portions 18 and 19 terminating in inwardly directed closely adjacent toothed ends 20 and 21 for biting into the tire on opposite sides of its tread. In this form each of the end portions 18 and 19 is the full width of the looped portion, one of the end portions being welded or otherwise permanently secured to the looped portion 17, as shown at 22.

It will be noted in all of the forms shown that by providing the pair of end portions at each end of the intermediate portion with inwardly turned ends for biting into the tire on opposite sides thereof, whether the ends be closely adjacent or widely separated, the unintentional separation of the anti-skid device from the tire is prevented when the tire is rotating in either direction.

It will also be noted that by the use of the pair of end portions at each end of the device the tendency of the device to creep along the tire and cut it is eliminated as it provides two points of attachment at each side of the tire tread instead of one as heretofore.

These features are very important because when only a single inclined end portion is provided at each end of the device it will hold the device tightly to the tire when the tire is rotating in one direction but there is a tendency of the device to become detached from the tire when the tire is rotating in the opposite direction.

It is evident that various changes may be made in the construction, form and arrangement of the several parts without departing from the spirit and scope of my invention, and hence I do not intend to be limited to the particular embodiments herein shown and described.

What I claim is:

1. An anti-skid device adapted to be removably attached directly to a vehicle tire and comprising an elastic portion stretchable across the tire tread and provided at each end with a pair of resilient end portions terminating in inwardly directed ends for biting into the tire on opposite sides of its tread.

2. An anti-skid device adapted to be removably attached directly to a vehicle tire and comprising an elastic portion stretchable across the tire tread and provided at each end with a pair of resilient end portions terminating in inwardly directed toothed ends for biting into the tire on opposite sides of its tread.

3. An anti-skid device adapted to be removably attached directly to a vehicle tire and comprising an elastic solid portion stretchable across the tire tread and provided at each end with a pair of resilient end portions terminating in inwardly directed ends for biting into the tire on opposite sides of its tread.

4. An anti-skid device adapted to be removably attached directly to a vehicle tire and comprising an elastic solid portion stretchable across the tire tread and provided at each end with a pair of resilient end portions terminating in inwardly directed toothed ends for biting into the tire on opposite sides of its tread.

5. An anti-skid device adapted to be removably attached directly to a vehicle tire and comprising an elastic solid portion stretchable across the tire tread and provided at each end with a pair of resilient end portions terminating in inwardly directed ends for biting into the tire on opposite sides of its tread, the said elastic solid portion being provided with a non-skid surface.

6. An anti-skid device adapted to be removably attached directly to a vehicle tire and comprising an elastic solid portion stretchable across the tire tread and provided at each end with a pair of resilient end portions terminating in inwardly directed ends for biting into the tire on opposite sides of its tread, the said elastic solid portion being provided with holes.

7. An anti-skid device adapted to be removably attached directly to a vehicle tire and comprising an elastic solid portion stretchable across the tire tread and provided at each end with a pair of resilient end portions terminating in inwardly directed ends for biting into the tire on opposite sides of its tread, the said elastic portion being provided with projections.

8. An anti-skid device adapted to be removably attached directly to a vehicle tire and comprising an elastic portion stretchable across the tire tread and provided at each end with a pair of resilient end portions terminating in inwardly directed closely adjacent ends for biting into the tire on opposite sides of its tread.

9. An anti-skid device adapted to be removably attached directly to a vehicle tire and comprising an elastic portion stretchable across the tire tread and provided at each end with a pair of resilient end portions terminating in inwardly directed widely separated ends for biting into the tire on opposite sides of its tread.

10. An anti-skid device adapted to be removably attached directly to a vehicle tire and comprising a resilient bar developed into a looped portion adapted to be stretched across the tire tread and provided at each end with a pair of end portions terminating in inwardly directed ends for biting into the tire on opposite sides of its tread.

11. An anti-skid device adapted to be removably attached directly to a vehicle tire and comprising a resilient bar developed into a looped portion adapted to be stretched across the tire tread and provided at each end with a pair of end portions terminating in inwardly directed closely adjacent ends for biting into the tire on opposite sides of its tread.

12. An anti-skid device adapted to be removably attached to a vehicle tire and comprising a resilient bar developed into a looped portion adapted to be stretched across the tire tread, said looped portion being divided at each end into a pair of end portions terminating in inwardly directed ends for biting into the tire on opposite sides of its tread.

JOSEPH A. MORRONE.

No references cited.